(12) United States Patent
Schrader et al.

(10) Patent No.: US 7,050,126 B2
(45) Date of Patent: May 23, 2006

(54) DIRECT VIEW DISPLAY BASED ON LIGHT DIFFRACTION FROM A DEFORMABLE LAYER

(75) Inventors: Martin Schrader, Tampere (FI); Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 110 days.

(21) Appl. No.: 10/406,612

(22) Filed: Apr. 3, 2003

(65) Prior Publication Data

US 2004/0196411 A1   Oct. 7, 2004

(51) Int. Cl.
*G02F 1/1335* (2006.01)
(52) U.S. Cl. ......................................................... 349/57
(58) Field of Classification Search ................. 349/57, 349/110, 112–114, 95, 111
See application file for complete search history.

(56) References Cited

U.S. PATENT DOCUMENTS

| | | | |
|---|---|---|---|
| 4,626,920 A | 12/1986 | Glenn | 358/234 |
| 5,504,597 A * | 4/1996 | Sprague et al. | 349/57 |
| 6,437,921 B1 * | 8/2002 | Whitehead | 359/640 |
| 6,445,433 B1 | 9/2002 | Levola | 349/113 |
| 6,603,444 B1 * | 8/2003 | Kawanami et al. | 345/32 |
| 6,657,700 B1 * | 12/2003 | Sako et al. | 349/158 |

FOREIGN PATENT DOCUMENTS

WO   WO 02/091059   11/2002

\* cited by examiner

*Primary Examiner*—Andrew Schechter
*Assistant Examiner*—Thoi V. Duong
(74) *Attorney, Agent, or Firm*—Ware, Fressola, Van Der Sluys & Adolphson LLP

(57) ABSTRACT

A direct view display device based on light reflection and diffraction from a deformable material layer under influence of an electric field. The display device comprises a plurality of pixel cells, each cell has at least a first prism surface to support the deformable material, such that when the electric field is off, a light beam travels through the first prism surface and the deformable material is reflected via total internal reflection through the first prism surface to a second prism surface, whereby the light beam is directed toward a beam blocker. When the electric field is on, the deformable material forms a rippled surface to diffract the encountering light beam, allowing part of the light beam to avoid the beam blocker. A microlens is used for each pixel cell to focus the light beam at the beam blocker.

15 Claims, 16 Drawing Sheets

DIRECT VIEW DISPLAY BASED ON LIGHT DIFFRACTION FROM A DEFORMABLE LAYER

FIELD OF THE INVENTION

The present invention relates generally to a display device and, in particular, a display device that is based on a light valve for turning on or off a pixel.

BACKGROUND OF THE INVENTION

Presently, there are a number of non-emissive display devices on the market. One of those display devices is the liquid-crystal display (LCD), which uses the polarization properties of the liquid-crystal molecules to block a light beam or to allow the light beam to transmit through. The polarization properties of the liquid-crystal molecules are controllable by an electric field generated by a pair of electrodes disposed on a pixel. The major disadvantages of the LCD include the relatively slow switching time and that the light beam passing through the liquid crystal layer must be polarized. A polarized beam reduces the light efficiency of the device.

It is advantageous and desirable to provide an imaging or display device that does not require polarized light and has fast switching time.

Levola (U.S. Pat. No. 6,445,433 B1) discloses a projection system that uses an imaging lens with a beam stop to focus light reflected from a light-valve structure in order to form an image on a projection screen. In particular, the light-valve structure has a layer of reversibly deformable material disposed between a glass plate and a silicon backplane active matrix, as shown in FIGS. 1a and 1b. A section of the light-valve structure is shown in FIGS. 2a and 2b. As shown, a transparent electrode layer is disposed on the lower surface of the glass plate and an electrode array disposed on top of the silicon backplane for applying an electric field on the deformable material. When the electric field is off, the upper surface of the transparent deformable material is substantially flat, as shown in FIG. 2a. An illumination beam will pass the transparent deformable layer unaltered, reflect off the electrode structure and propagate toward the projection screen as it would when reflecting from a plane mirror (see FIG. 1a). When the electric field is turned on, the deformable material is deformed to form ripples on the upper surface, as shown in FIG. 2b. These ripples can cause a locally varying phase change in the beam that is passing through the deformable material and reflected of the electrode structure. As a result, part of the light beam reflected by the electrodes is diffracted due to these phase variations and is directed away from the lens stop (see FIG. 1b). With the imaging lens, light that avoids the lens stop can be focused to form an image on a projection screen, for example. Thus, when the electric field is off, the pixel on the light valve structure as seen on the projection is "black" or "dark", because substantially no light reflected from that pixel avoids the beam stop. But when the electric field is on, the pixel on the light valve structure as seen on the projection screen is "white" or "bright". Basically, this projection system is a Schlieren optical system, which forms an image based on spatially shifted light.

In particular, the deformable material used in the light-valve structure is a dielectric, viscoelastic gel, as disclosed in Schrader (WO 02/091059 A1) and Glenn (U.S. Pat. No. 4,626,920). Partially depending on the thickness of the material layer that forms the pixel, the switching time between a "white" state and a "black" state is much shorter than the switching time of a liquid crystal material with comparable thickness. Furthermore, another advantage of the deformable material over the liquid crystal material is that polarized light is not necessary in an optical system that uses the deformable material as a light-valve.

Thus, it is desirable and advantageous to use this dielectric, viscoelastic, deformable material in a display device that can be viewed with the naked eye without the aid of a projection device.

SUMMARY OF THE INVENTION

It is an objective of the present invention to provide a display device that can be viewed with the naked eye without the aid of a projection device, wherein a deformable material is used to influence a light beam in a pixel of the display device. The objective can be achieved by making use of the total internal reflection properties of a deformable material to direct the light beam.

Thus, according to the first aspect of the present invention, there is provided a display device, which comprises:

a first substrate having a first side and an opposing second side;

a plurality of beam blockers adjacent the first side of the first substrate, the beam blockers spaced from each others; and a second substrate having a third side and an opposing fourth side, wherein the third side of the second substrate is spaced from the second side of the first substrate to form a gap therebetween for forming a plurality of pixel cells, each cell comprising:

a first interface on the second side of the first substrate;

a second interface on the third side of the second substrate;

a first electrode layer adjacent the first interface;

a second electrode layer adjacent the second interface; and a layer of deformable material disposed between the first and second electrode layers for affecting a light beam traveling from the second substrate toward the second side of the first substrate and then to the first side of the first substrate, wherein the first and second electrode layers are capable of providing an electric field, operable in a first state and in a second state, for influencing the deformable material, such that when the electric field is in the first state, the deformable material causes the light beam to encounter one of the beam blockers, and when the electric field is in the second state, the deformable material causes the light beam to diffract at least partially for providing a plurality of spatially shifted beams toward the first side of the first substrate in such a way that at least a portion of the shifted beams is directed away from said beam blocker.

Preferably, the display device further comprises:

a plurality of first prisms on the second side of the first substrate, each first prism having a first prism surface, and a plurality of second prisms on the third side of the second substrate, each second prism having a second prism surface, such that the first interface includes at least one first prism surface and the second interface includes at least one second prism surface, wherein the deformable material is disposed on said second prism surface, the deformable material having a material surface spaced from said second prism surface, such that the light beam traveling from the second substrate also travels through the deformable material and is directed by the material surface through the second prism surface toward the second side of the first substrate and then reflected by the second interface to the first side of the first substrate; and when the electric field is in the first state, at least a part of the material surface is substantially flat for directing the light beam via total internal reflection, and when the electric field is in the second state, at least a part of the material surface is rippled to cause the light beam to diffract.

The display device further comprises a plurality of microlenses disposed on the fourth side of the second substrate such that in said each cell one of the microlenses focuses the light beam traveling from the second substrate toward the second side of the first substrate and said focusing causes said light beam to focus substantially at said one beam blocker; and a diffuser layer disposed adjacent to the first side of the first substrate to diffuse said at least portion of the shifted beam.

Alternatively, the display device comprises a reflecting surface disposed adjacent to the first side of the first substrate to reflect said at least portion of the shifted beam to the fourth side of the second substrate and through said one microlens.

Alternatively, the beam blocker comprises a reflecting surface to cause the light beam encountering said one beam blocker to travel from the first side of the first substrate to the second side of the substrate, the third side of the second substrate and then the fourth side of the substrate, said display device further comprising a light absorber layer disposed adjacent the first side of the first substrate to absorb said at least portion of the shifted beam.

Preferably, the second electrode layer comprises a plurality of electrode strips spaced from each other by a spacing distance so that when the electric field is in the second state, the rippled surface forms a grating structure with a grating period substantially equal to the spacing distance.

Alternatively, the deformable material is disposed on said first prism surface, the deformable material having a material surface spaced from said first prism surface, such that the light beam traveling from the second substrate is also reflected by the second prism surface through the first prism surface, through the deformable material and is directed by the material surface through the first prism surface toward the first side of the first substrate, and when the electric field is in the first state, at least a part of the material surface is substantially flat for directing the light beam via total internal reflection, and when the electric field is in the second state, at least a part of the material surface is rippled to cause the light beam to diffract.

The display device further comprises a plurality of microlenses disposed on the fourth side of the second substrate such that one of the microlenses focuses the light beam traveling from the second substrate toward the second side of the first substrate in said each cell and said focusing causes said light beam to focus substantially at said one beam blocker.

According to the second aspect of the present invention, there is provided a method of operating a pixel of a display device in a first pixel state and a second pixel state, the display device comprising a first substrate and a second substrate, the first substrate having a first side and an opposing second side, the second substrate having a third side and an opposing fourth side adjacent the second side of the first substrate, wherein the pixel comprises:

a beam blocker adjacent the first side of the first substrate, and a cell having a first interface on the first side of the first substrate and a second interface on the third side of the second substrate, the first and second interfaces spaced from each other forming a gap therebetween so as to allow a light beam to travel from the second substrate through the second interface toward the first interface and the first side of the first substrate, and then to the beam blocker. The method comprises the steps of:

providing in the gap a layer of deformable material capable of influencing the light beam, and causing the deformable material to operate in a first surface form when the pixel is operated in the first pixel state, and a second surface form when the pixel is operated in the second pixel state, wherein when the deformable material is operated in the first surface form, the deformable material causes the light beam to encounter the beam blocker, and when the deformable material is operated in the second surface form, the deformable material causes the light beam to diffract at least partially for providing a plurality of spatially shifted beams such that at least a portion of the shifted beams is directed away from the beam blocker.

Preferably, the method further comprises the step of providing an electric field to cause the deformable material to operate in the first surface form or in the second surface form, wherein the pixel further comprising a first electrode layer disposed on the first interface and a second electrode layer on the second interface for providing the electric field.

Preferably, the display device further comprises:

a plurality of first prisms on the second side of the first substrate, each prism having a first prism surface; and a plurality of second prisms on the third side of the second substrate, each second prism having a second prism surface, such that the first interface includes at least one first prism surface and the second interface includes at least one second prism surface, wherein the deformable material is disposed on said second prism surface, the deformable material having a material surface spaced from said second prism surface, such that the light beam traveling from the second substrate also travels through the deformable material and is directed by the material surface through the second prism surface toward the second side of the first substrate and then reflected by the second interface to the first side of the first substrate; and when the deformable material is operated in the first surface form, at least a part of the material surface is substantially flat for directing the light beam via total internal reflection toward the beam blocker, and when the deformable material is operated in the second surface form, at least a part of the material surface is rippled to cause the light beam to diffract.

The method further comprises the step of providing a reflecting surface adjacent the first side of the first substrate to reflect said at least portion of the shifted beam to the forth side of the second substrate.

Alternatively, the method further comprises the steps of:

providing a reflecting surface on said one beam blocker to cause the light beam encountering the beam blocker to travel from the first side of the first substrate to the second side of the substrate, the third side of the second substrate and then the fourth side of the second substrate, and providing a light absorber layer adjacent the first side of the first substrate to absorb said at least portion of the shifted beam.

Alternatively, the deformable material is disposed on said first prism surface, the deformable material having a material surface spaced from said first prism surface, such that the light beam traveling from the second substrate is reflected by the second prism surface through the first prism surface, through the deformable material and is directed by the material surface through the first prism surface toward the first side of the first substrate, and when the deformable material is operated in the first surface form, at least a part of the material surface is substantially flat for directing the light beam via total internal reflection toward the beam blocker, and when the deformable material is operated in the second surface form, at least a part of the material surface is rippled to cause the light beam to diffract.

The present invention will become apparent upon reading the description taken in conjunction of FIGS. 3 to 12.

BRIEF DESCRIPTION OF THE DRAWINGS

FIG. 2b is a cross sectional view of the light value structure in the prior art projection system wherein the electric field is turned on.

BEST MODE FOR CARRYING OUT THE INVENTION

Figure 1A:
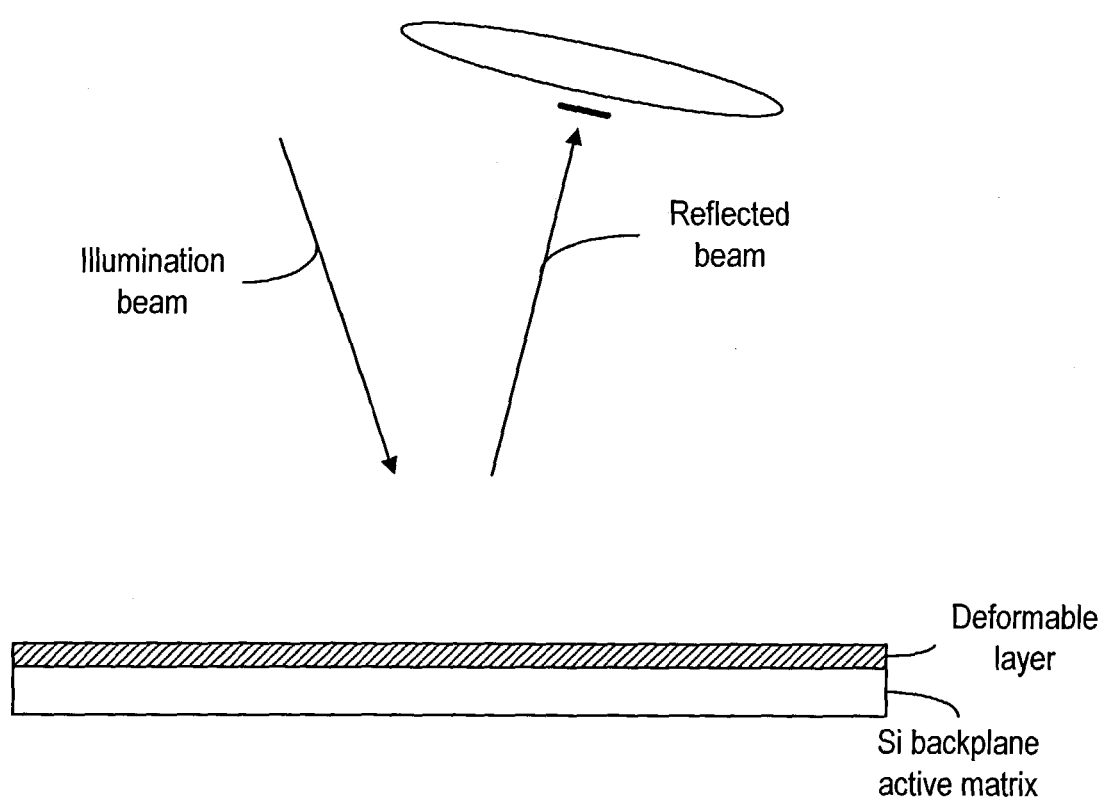
FIG. 1a is a schematic representation illustrating a prior art projection system using a deformable material in a light-valve structure, wherein the pixel in the light-valve structure is in a "dark" state.
Figure 1B:
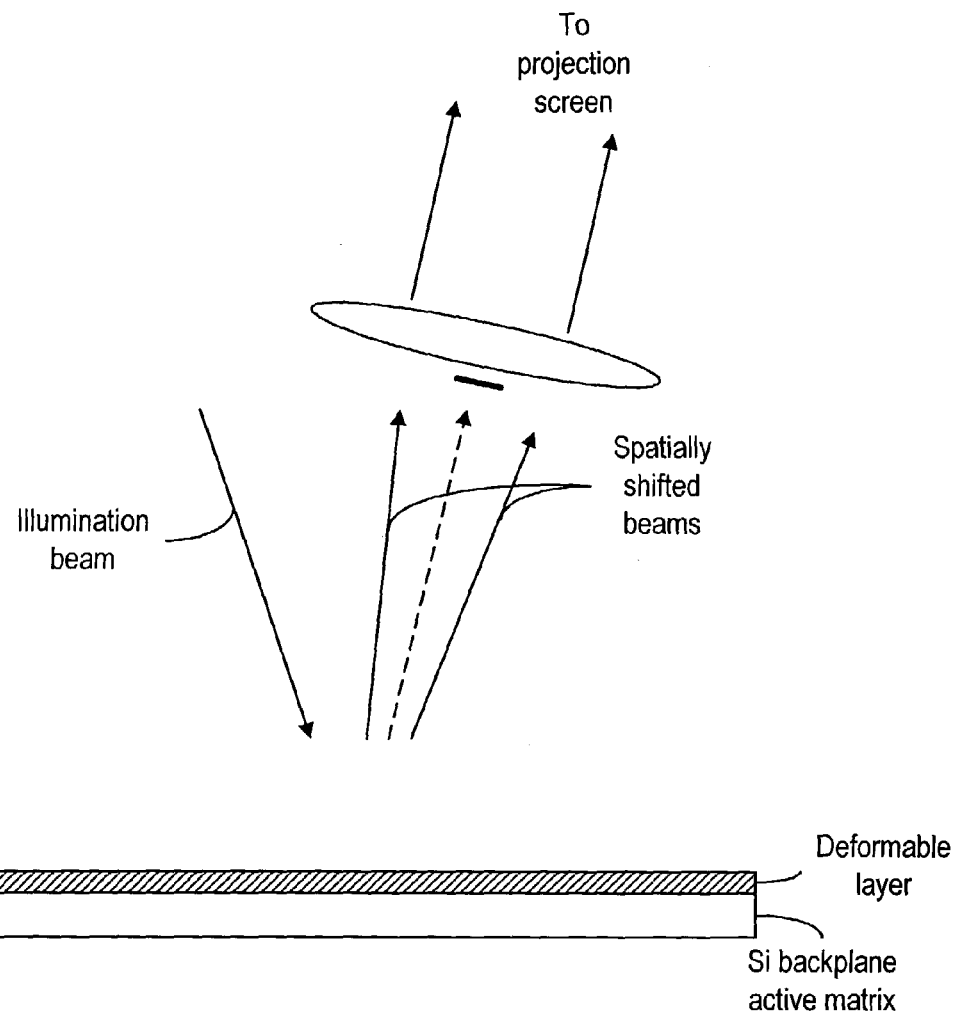
FIG. 1b is a schematic representation illustrating the projection system of FIG. 1 wherein the pixel in the light-valve is in a "bright" state.
Figure 2A:
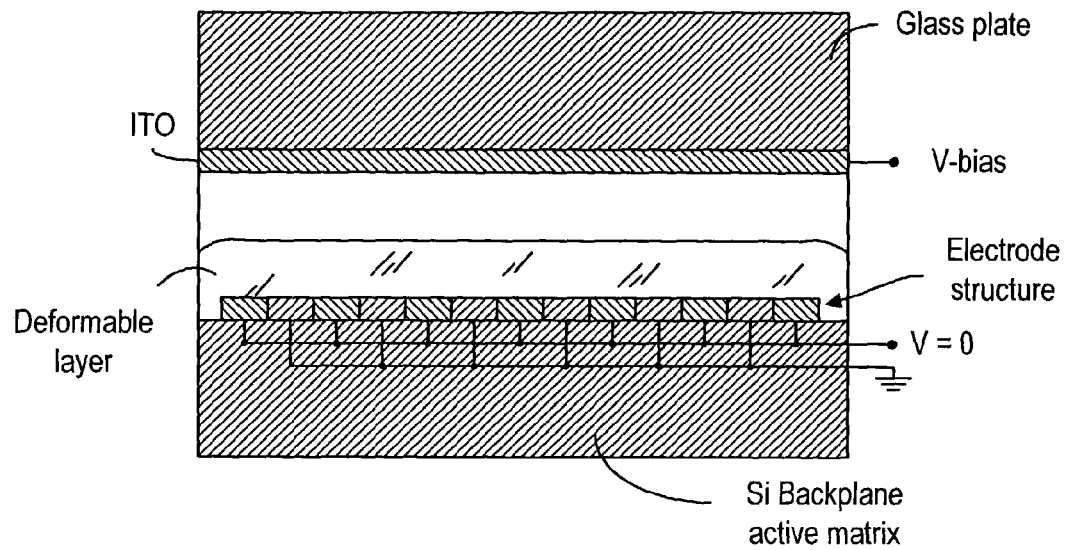
FIG. 2a is a cross sectional view of the light-valve structure in the prior art projection system wherein the electric field is turned off.
Figure 2B:
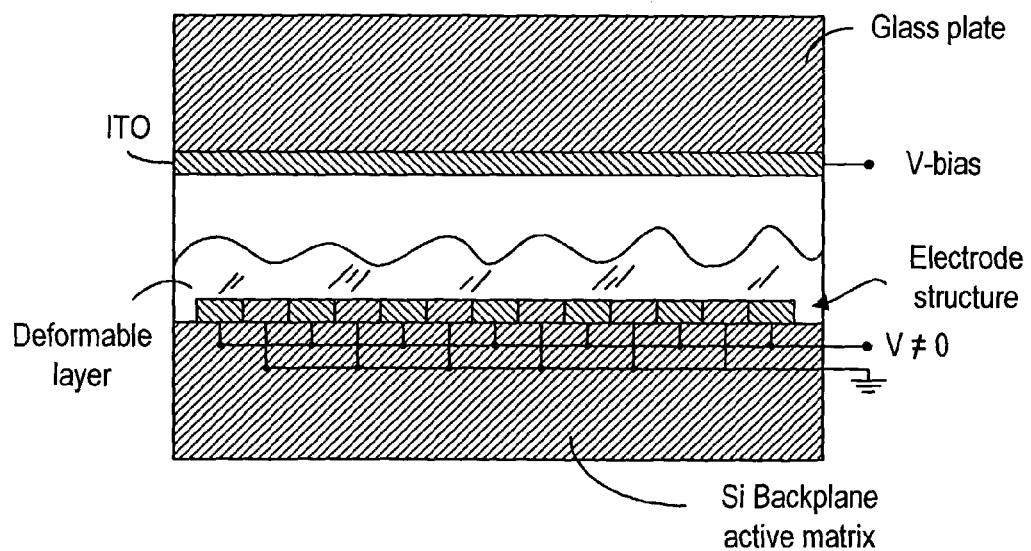
Figure 3:
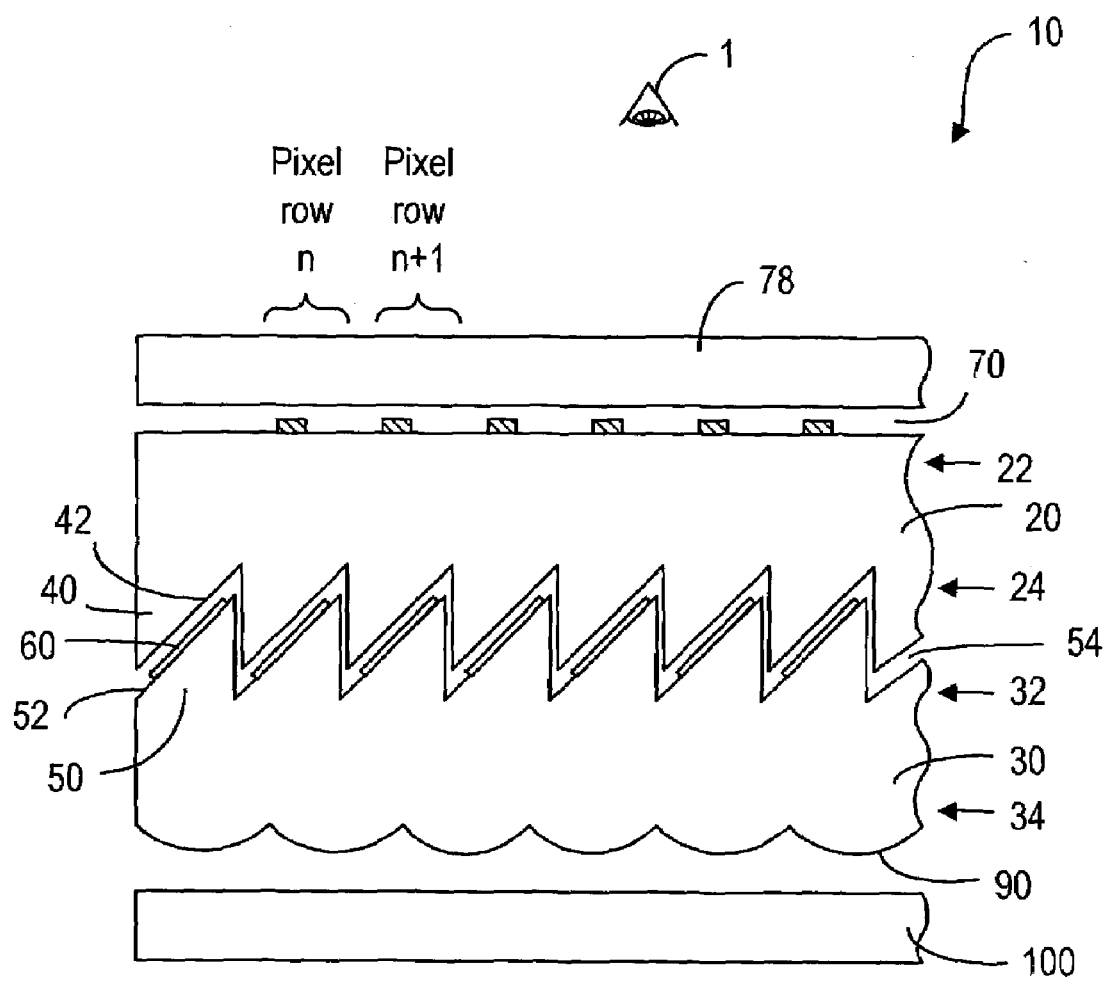
FIG. 3 is a schematic representation showing a preferred embodiment of a direct-view display, according to the present invention.

The preferred embodiment of the direct view display, according to the present invention, makes use of the total internal reflection (TIR) properties of the deformable surface. As shown in FIG. 3, the direct-view display 10 comprises a first substrates 20 having a first side 22 and a second side 24, and a second substrates 30 having a first side 32 and a second side 34. The display 10 also comprises a plurality of microprisms 40 disposed on the second side 24 of the first substrate 20 and a plurality of microprisms 50 disposed on the first side 32 of the second substrate 30 for forming a plurality of microprism cells. Each microprism 40 has an interface 42 and each microprism 50 has an interface 52 facing the interface 42 of the corresponding microprism 40. The interface 42 and the interface 52 in a microprism cell are spaced from each other, forming a gap 54, in which a layer of deformable material 60 is disposed. Preferably, the deformable material 60 is disposed on the interface 52 of the microprism 50. As shown in FIG. 3, a plurality of beam stoppers 70 are disposed on or near the first side 22 of the first substrate 20, each beam stopper associated with a microprism cell. A diffuser 78, disposed adjacent to the first side 22 of the substrate 20 to improve the viewing by a viewer 1.

Figure 4A:
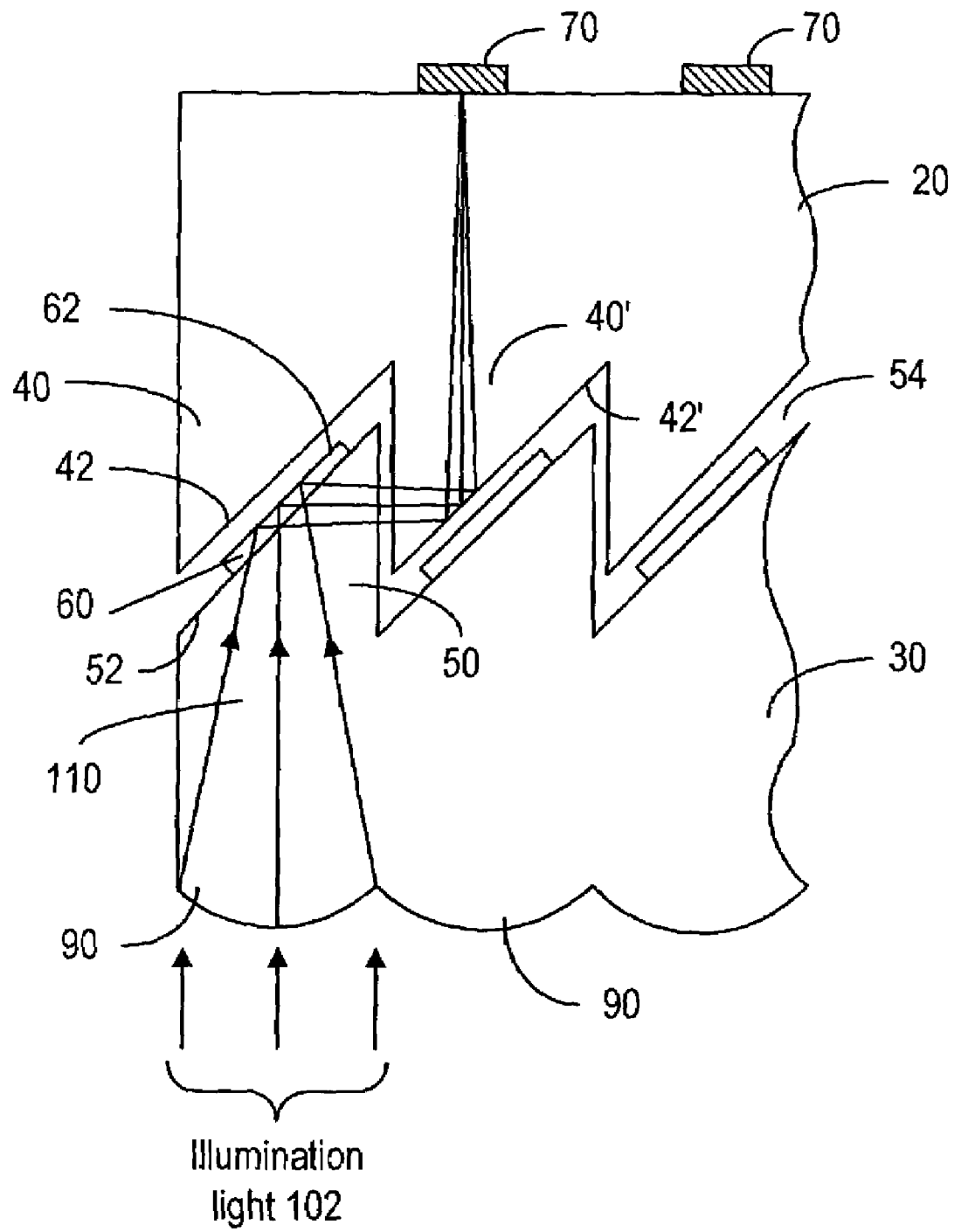
FIG. 4a is a schematic representation showing a pixel of the direct-view display operating in an off state.

For illumination, a light source 100 is disposed adjacent to the second side 34 of the second substrate 30. A plurality of microlenses 90 is disposed on the second side 34 of the second substrate 30, as shown in FIG. 4a. Each microlens 90 is used to provide a focused beam 110 for each microprism cell and the focus of the focused beam is located substantially at the beam stopper 70 associated with the microprism cell.

It is understood that the deformable material 60 can be induced by an electric field to form ripples on its surface 62. But when the electric field is in an "off" state, the surface 62 of the deformable material 60 acts like a flat interface for reflecting the light beam 110 via TIR, as shown in FIG. 4a. To assure that the light is reflected at the interface 62 of deformable layer and air and not at the interface 52 of prism and deformable layer, the indices of refraction of deformable layer and prism shall not differ significantly (the acceptable difference of the indices depends on the angles of incidence at the interface). As such, the reflected beam is directed toward the interface 42' of the adjacent microprism 40'. This reflected beam is further reflected by the interface 42' via TIR toward the beam stopper 70. Because the beam 110 is substantially stopped by the beam stopper 70, the pixel on this microprism cell appears "dark" or "black" to the viewer 1 (see FIG. 3).

Figure 4B:
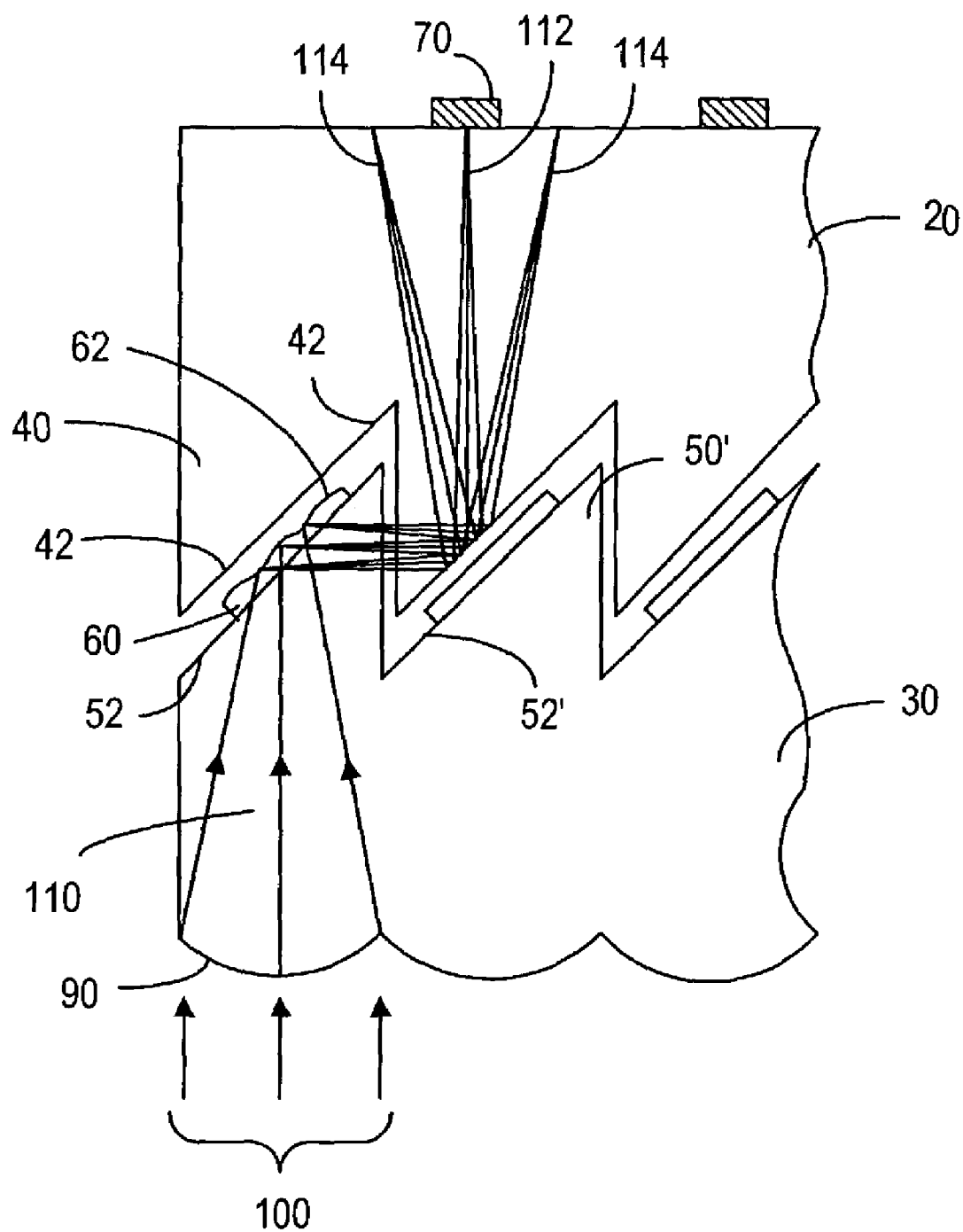
FIG. 4b is a schematic representation showing a pixel of the direct-view display operating in an on state.

Preferably, the ripples on the deformable surface act like a diffraction grating when the electric field is in an "on" state, so that the incoming beam 110 is at least partially diffracted or shifted by ripples formed on the deformable material 60. As a result, diffracted light that is directed toward the second side 24 and first side 22 of the substrate 20 includes a plurality of (first and higher order) diffracted beams 114 and an undiffracted beam 112, as shown in FIG. 4b. While the undiffracted beam 112 is stopped by the beam stopper 70, the diffracted beams 114 are able to avoid the beam stopper 70 and move beyond the substrate 20. At this state, the pixel of the microprism cell appears "bright" or "white" to the viewer 1.

Figure 5A:
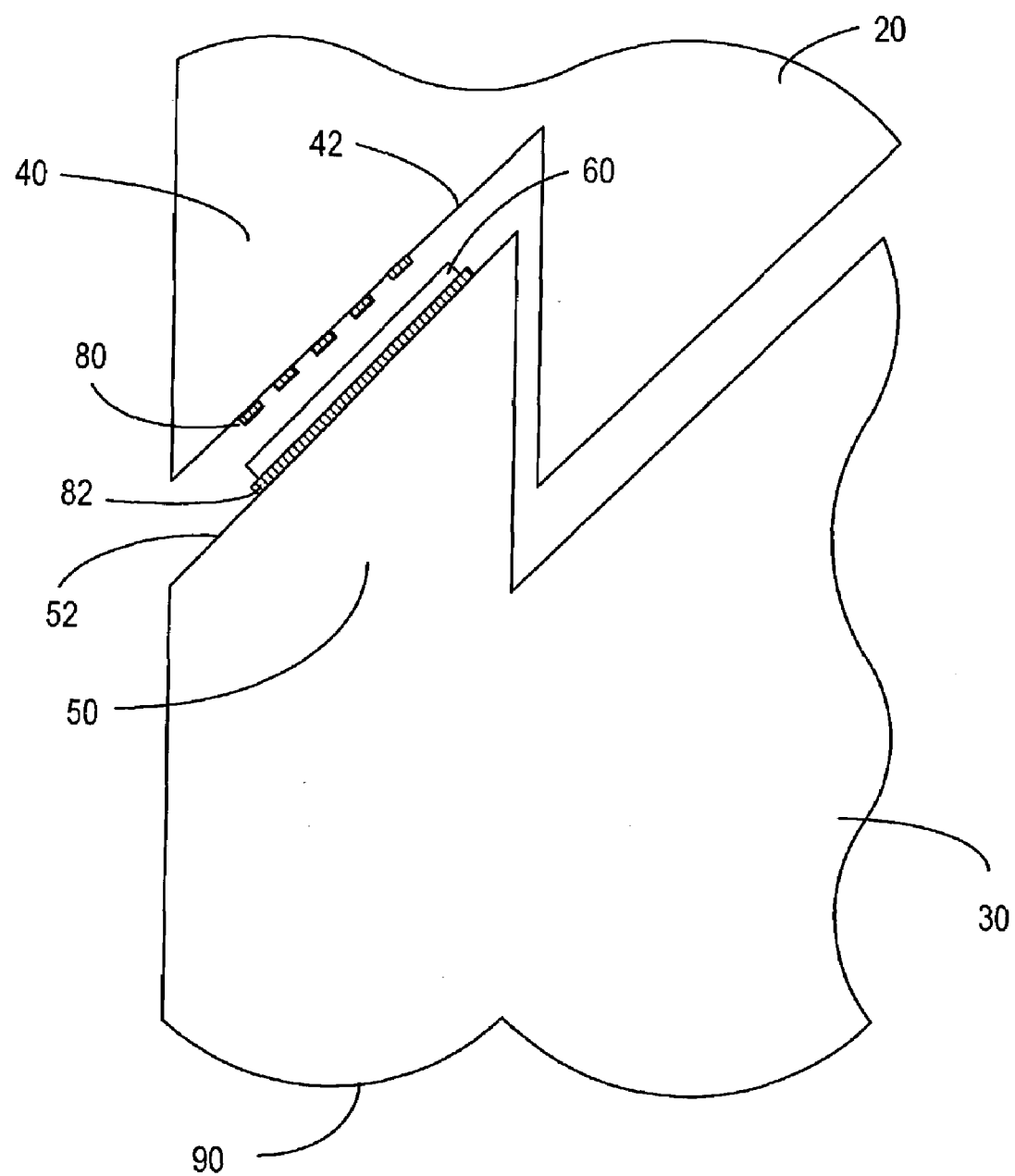
FIG. 5a is a schematic representation showing the electrode layers in a microprism cell.
Figure 5B:
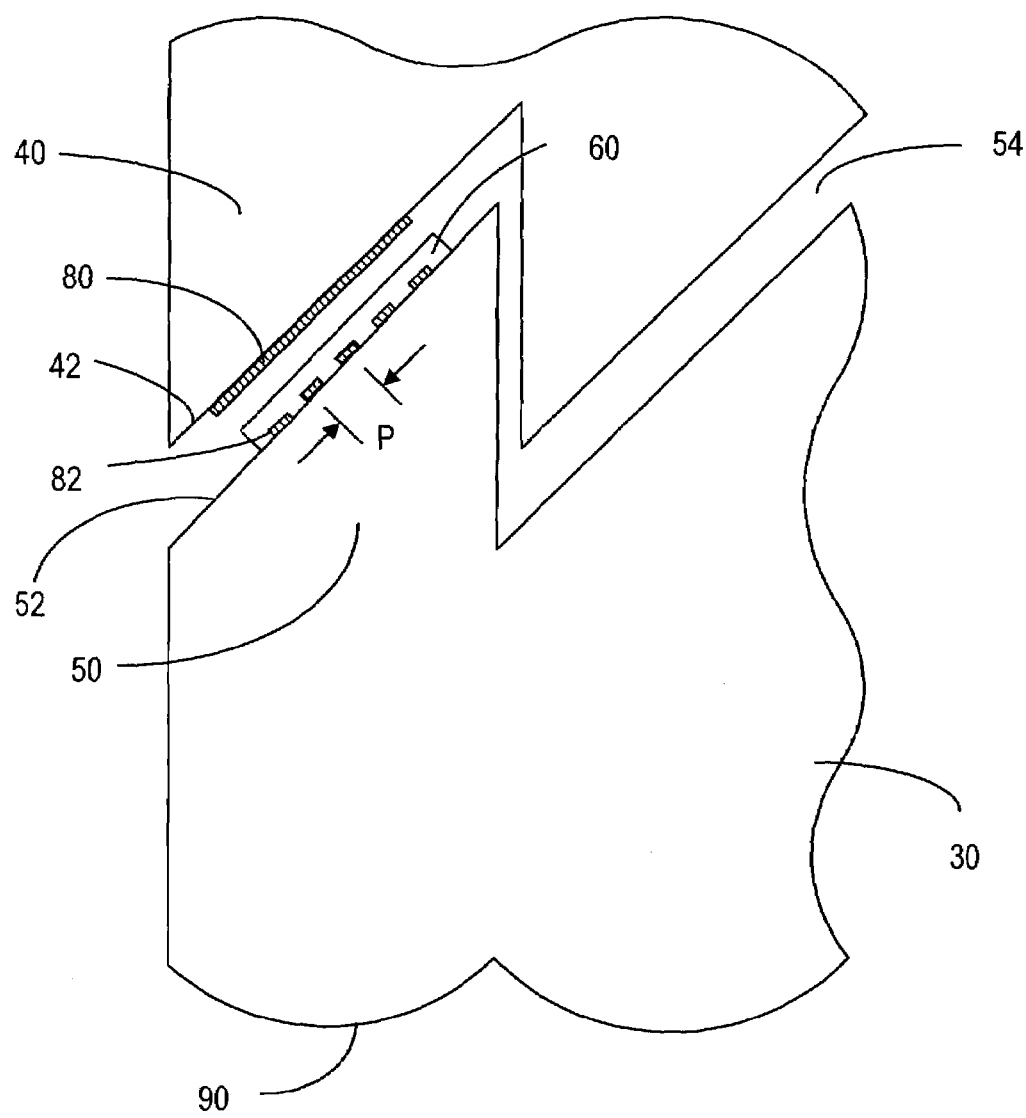
FIG. 5b is a schematic representation showing another arrangement for the electrode layers in a microprism cell.

The electric field that deforms the deformable material 60 is provided by a first electrode layer 80 disposed on the interface 42 of the microprism 40, and a second electrode layer 82 disposed on the interface 52 of the microprism 50. Preferably, the electrode layer 80 comprises an array of electrode strips, as shown in FIG. 5a. The spacing between the adjacent electrode strips determines the grating period, p, of the diffraction grating as formed by the rippled surface of the deformable material 60. Alternatively, the electrode layer 82 comprises an array of electrode strips, as shown in FIG. 5b.

Figure 6A:
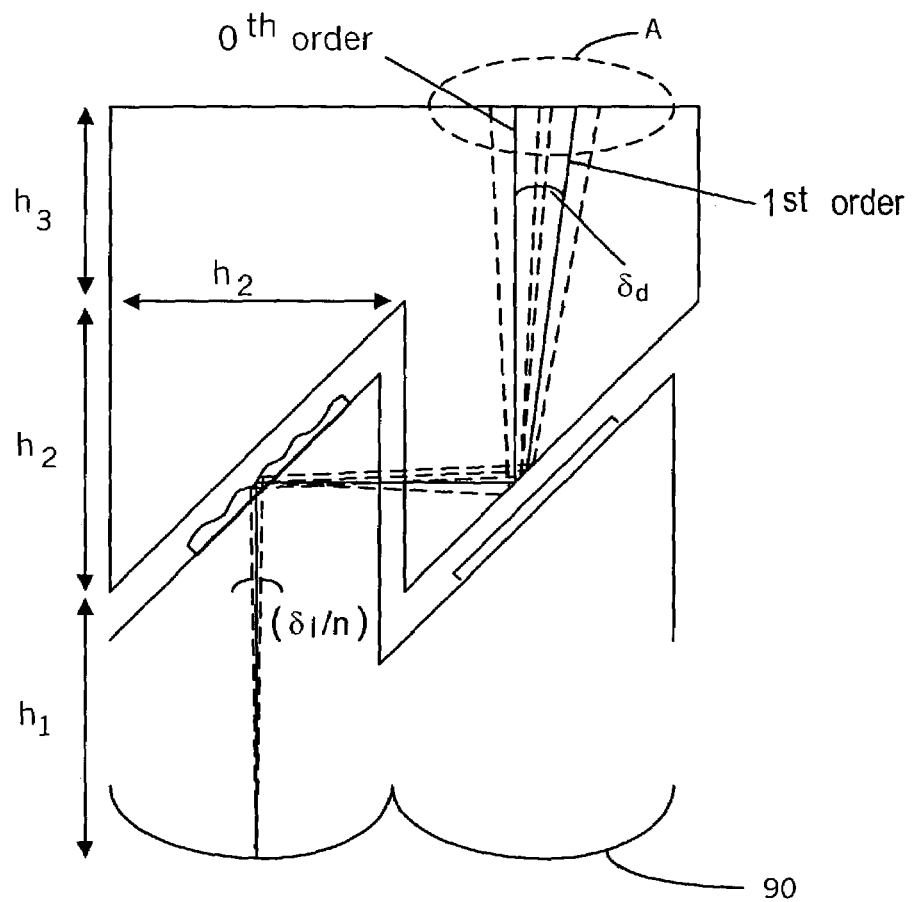
FIG. 6a is a schematic representation showing the effects of light source divergence on a pixel.
Figure 6B:
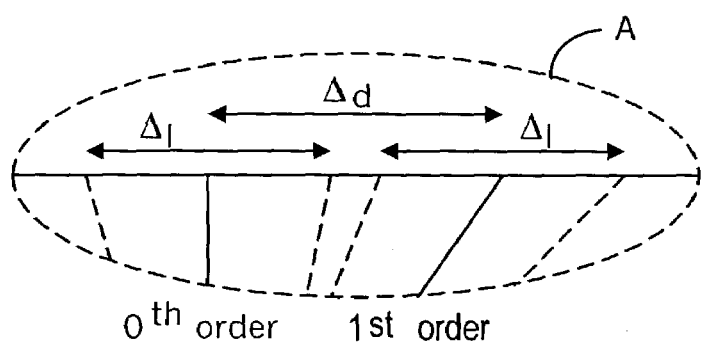
FIG. 6b is a schematic representation showing the details of beam spread.

Preferably, highly collimated light is used for illumination so as to produce a sharp focus at the beam stopper 70. However, as in any practical system, the illumination light will have a certain divergence angle $\delta_l$. This will cause the focus of the microlens 90 to be spread out by $\Delta_l$, as shown in FIGS. 6a and FIG. 6b. In order to be able to separate the diffracted beams from the undiffracted beam efficiently, the width of the beam stop 70 has to be equal or slightly greater than the spread-out focus, or $\Delta_l$. Furthermore, it is also important that the focus of the first-order diffracted light beams is sufficiently separated from the undiffracted beam. This leads to a condition for the grating period, p, as a function of the light source divergence, $\delta_l$.

As illustrated in FIG. 6, $$\Delta_l \approx f * \tan\frac{\delta_l}{n} \approx f * \frac{\delta_l}{n},$$

where $f = h_1 + 2*h_2 + h_3$ is the focal length of the microlens 90 and n is the refractive index of the second substrate 30.

For the distance between the center of the first-order beam focus and the center of the zero-order beam focus, we get $$\Delta_d = s * \tan \delta_d \approx s * \delta_d,$$

where s is the distance between the grating surface (interface 62) and the focal plane of the microlenses. According to FIG. 6, $$s = 1.5 h_2 + h_3.$$

Using the simple grating equation in paraxial approximation we have:

$$\Delta_d = s * \frac{\lambda}{n*p},$$

where $\lambda$ is the wavelength of light and p is the grating period. For reasons of simplification we assume here that n is the same for the deformable layer 60 and for the second substrate 30.

In order to avoid overlap of the spread out foci of zero- and first-order beams, the following conditions needs to be fulfilled:

$$\Delta_d \geq \Delta_l \Rightarrow$$

$$s * \frac{\lambda}{n*p} \geq f * \frac{\delta_l}{n} \Rightarrow$$

$$p \leq \frac{\lambda}{\delta_l} * \frac{s}{f}$$

As can be seen from the last equation, the maximum grating period is inversely proportional to the light source divergence.

If we assume a light source divergence of $\delta_l = 0.05$ rad, a wavelength $\lambda = 0.5$ μm, $h_1 = 0.1$ mm, $h_2 = 0.2$ mm and $h_3 = 0.7$ mm this requirement leads to a maximum grating period of 9.3 μm. More accurate calculations approximately give the same result.

MANUFACTURING ISSUES

Figure 7A:
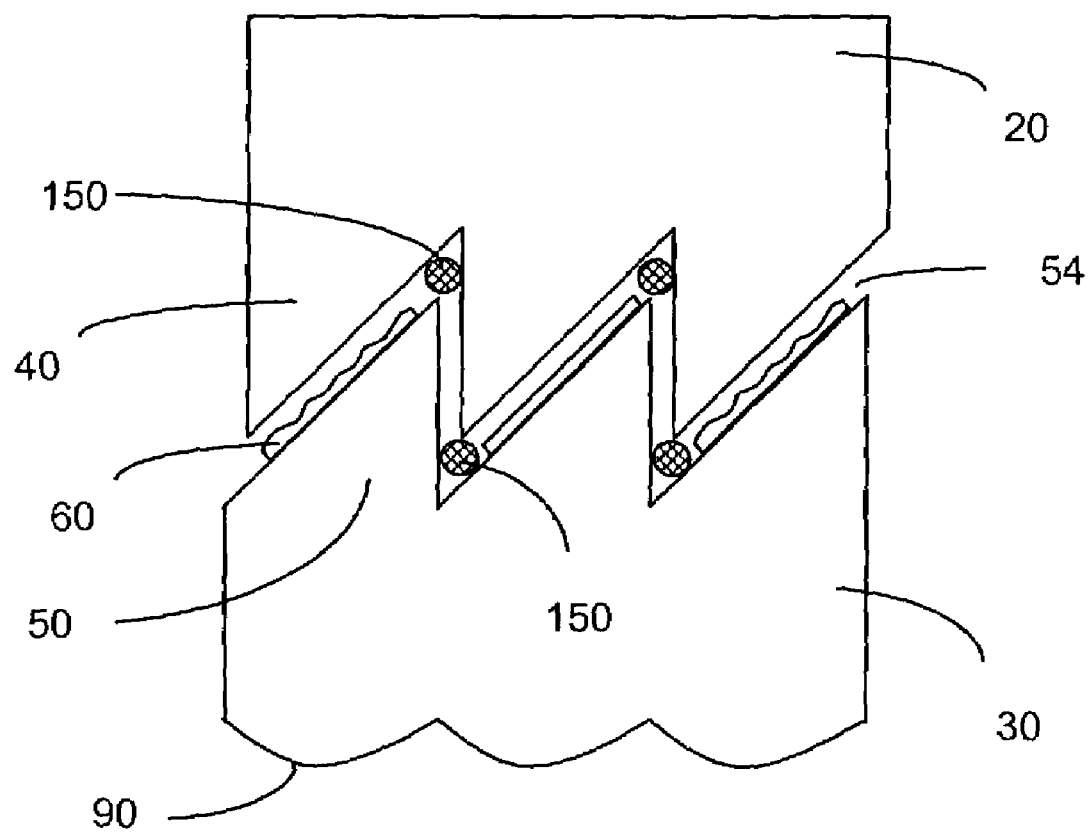
FIG. 7a is a schematic representation showing a method for achieving a gap in a pixel.

Microprism structures can be manufactured in mass production by molding of plastic. According to FIG. 7a, two substrates 20, 30 containing microprisms 40, 50 are needed, one of which includes the microlenses 90. Typical dimensions for a cellular phone display could be: 120×160 pixel with a pixel size of 200×200 μm. In the display, the thickness of bottom substrate 30 can be about 0.3 mm, and the thickness of top substrate 20 can be about 0.9 mm. Because there is some overlap of the top and bottom substrates, the overall device thickness, not including the illumination, can close to 1 mm.

Referring to FIG. 5a, it is preferred that the electrode layer 82 on the lower microprism 50 be a transparent ground electrode made of indium tin oxide (ITO), for example. The electrode strips of the electrode layer 80 disposed on the interface 42 of the upper microprism 40, however, do not have to be transparent because illumination light is supposed to be substantially reflected by the deformation material 60 via TIR toward the adjacent microprism 40 (see FIGS. 4a and 4b). Preferably, the deformable material 60 of about 5–15 microns is disposed on top of the electrode layer 82. An air gap of a few micrometers is provided between the deformable material layer and the electrode layer 80 in order to generate the electric field that penetrates the deformable material and causes the material to deform.

Alternatively, the electrode strips are disposed on the interface 52 of the lower microprism 50, as shown in FIG. 5b.

Figure 7B:
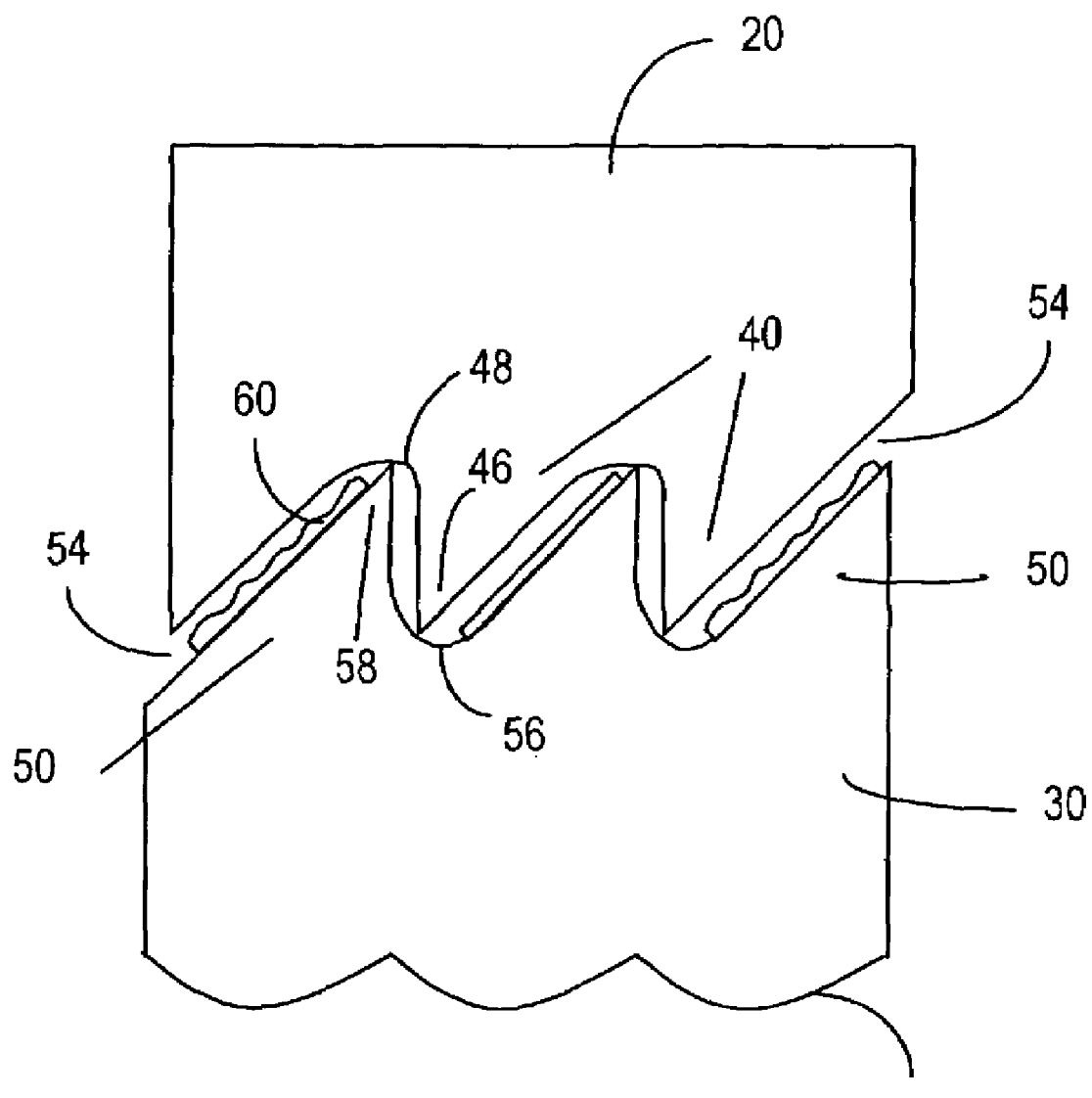
FIG. 7b is a schematic representation showing another method for achieving a gap in a pixel.

The air gap between the surface of the deformable material and the opposing electrode structure can be assured by a number of packaging methods. One way is to use conventional spacers 150, conducting or non-conducting according to the electrode structures, as can been seen from FIG. 7a. Another way is to use a flatter surface between adjacent microprisms as shown in FIG. 7b. As shown in FIG. 7b, the tip 58 of the microprism 50 and the tip 48 of the microprism 40 are reasonably sharp, and the base 46 of the microprism 40 and the base 56 of the microprism 50 are substantially flat so as to achieve self-alignment of the two microprism structures 40, 50.

ALTERNATIVE EMBODIMENTS

The direct view display as shown in FIGS. 3 to 4b is a transmissive design, in which a light source 100 is disposed below the microlenses 90 to provide illumination. The viewer 1 and the light source 100 are located on different sides of the display 10.

Figure 8:
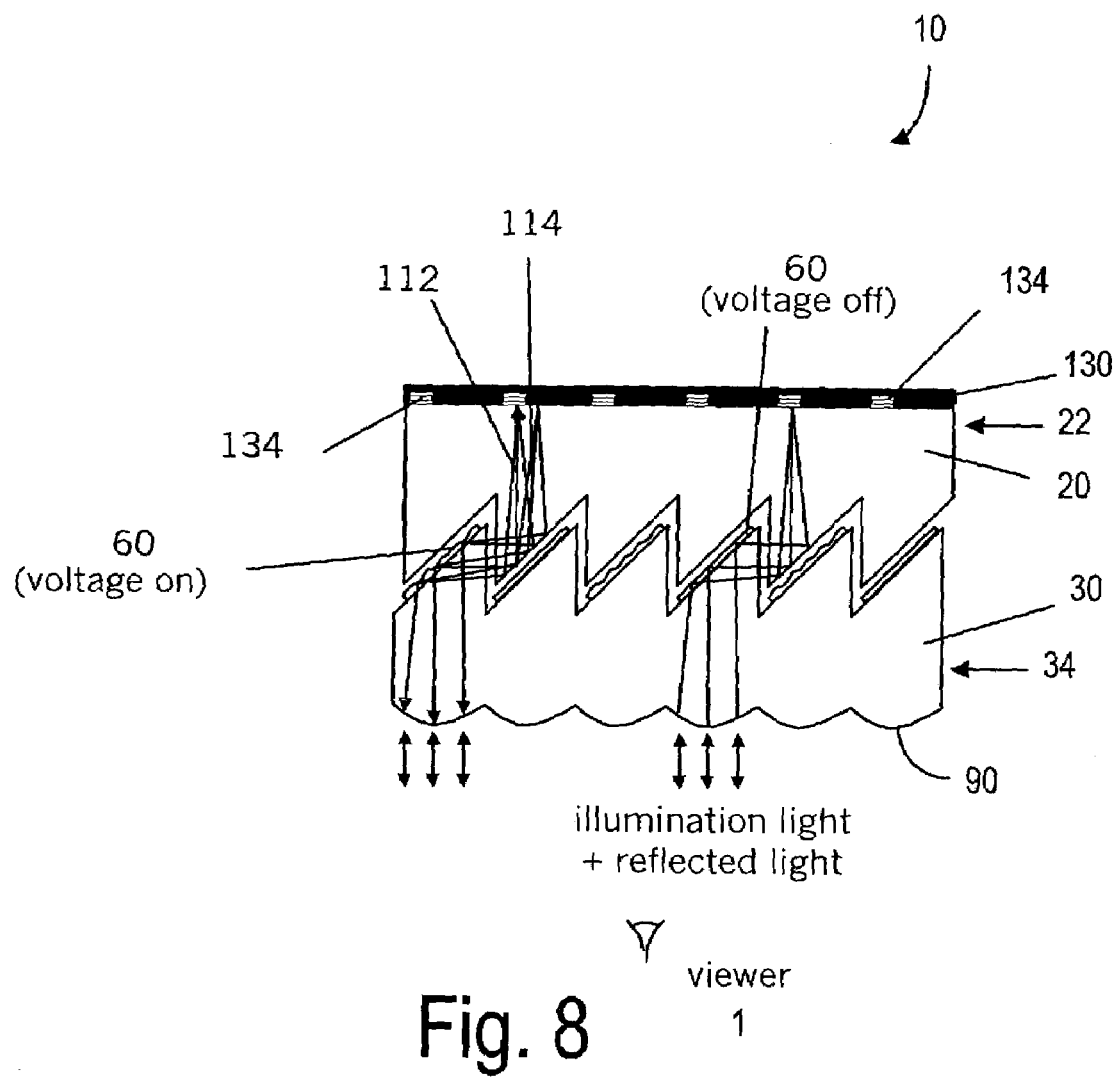
FIG. 8 is a schematic representation showing a reflective design using a plurality of reflecting surfaces to reflect the undiffracted beams and an absorber to absorb the diffracted beams.

It is possible to replace the beam stoppers 70, as shown in FIGS. 3 to 4b, by a plurality of reflector segments 134 such that the undiffracted beams 112 are reflected from the first substrate 20 toward the second substrate 30, as shown in FIG. 8, so as to allow the viewer 1 to see the reflected light through the microlenses 90. Moreover, an absorber 130 is disposed on the first side 22 of the first substrate 20 to absorb substantially all the diffracted beams 114. With this reflective design, when the electric field is off, the pixel appears bright. When the electric field is on, the pixel appears dark.

The pixel states in this reflective design are opposite to the pixel states in the transmissive design as shown in FIG. 3.

Figure 9:
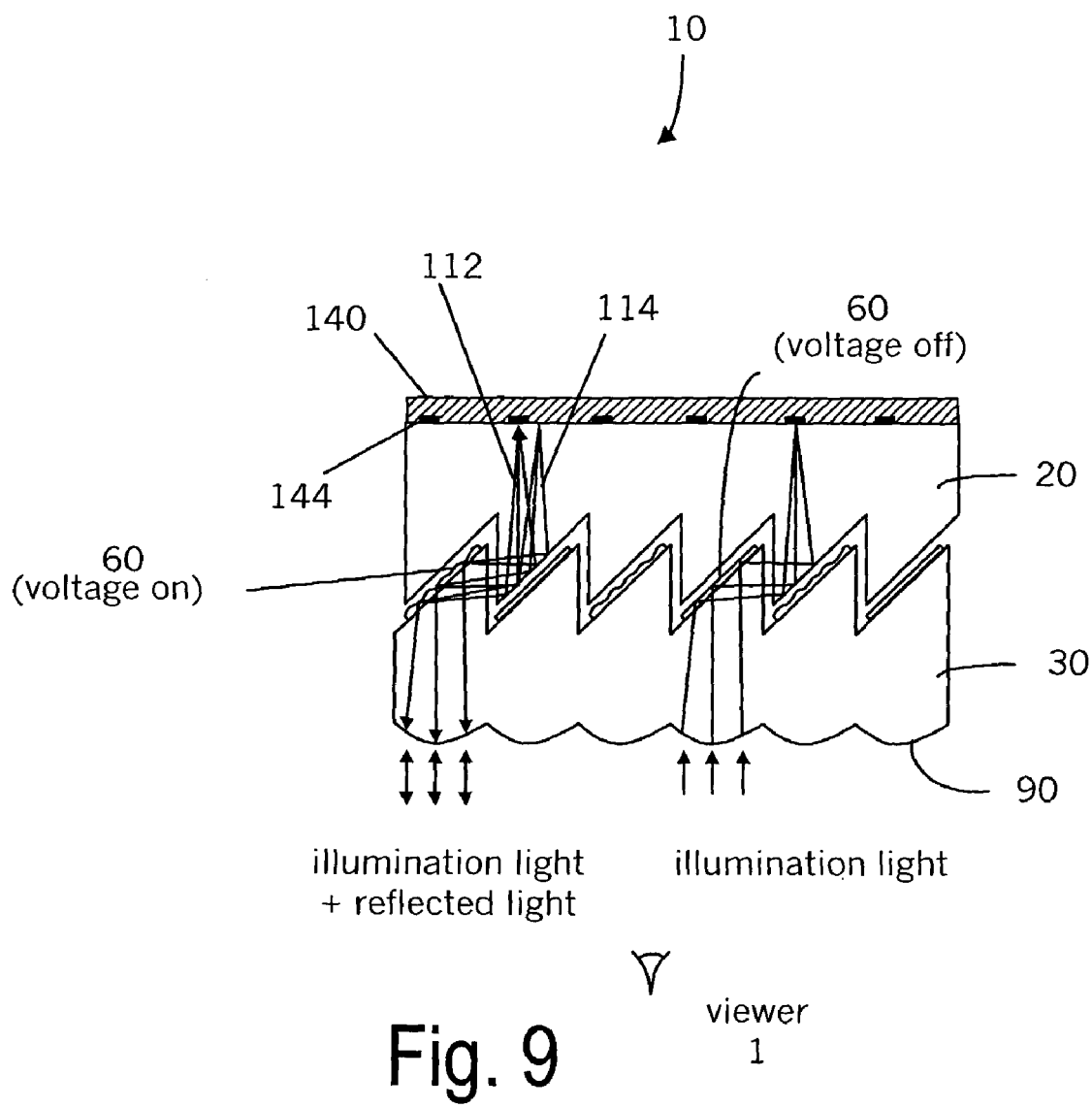
FIG. 9 is a schematic representation showing a reflective design using a mirror to reflect the diffracted beams and a plurality of absorbers to absorb the undiffracted beams.

Alternatively, the reflective display can be designed differently, as shown in FIG. 9. As shown, a reflecting surface or mirror 140 is used, in lieu of the absorber 130, to reflect the diffracted beams 114. At the same time, a plurality of absorbers 144, in lieu of the reflecting segments 134, are used to absorb the undiffracted beams 112. As such, when the electric field is off, the pixel appears dark, and when the electric field is on, the pixel appears bright.

Figure 10:
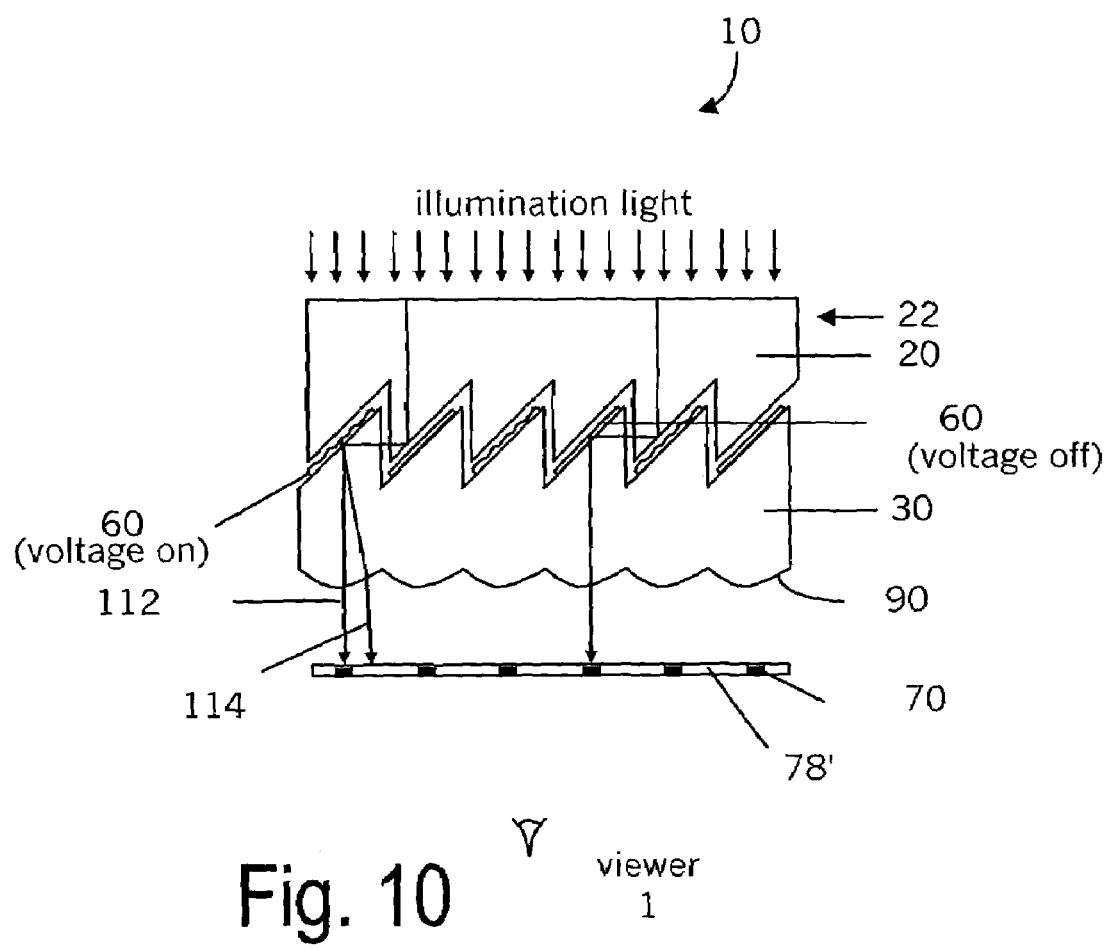
FIG. 10 is a schematic representation showing a different transmissive design of the direct-view display, illuminating through the first substrate and requiring a separate layer for the beam stops.

In yet another embodiment, the illuminating light source 100 is located on the first side 22 of the first substrate 20 and the viewer 1 views the direct view display 10 on the second side 34 of the second substrate 30, through the microlenses 90. In order to block the undiffracted beams 112, a plurality of beam stoppers 70 are placed near the microlenses 90, as shown in FIG. 10. Preferably, a diffuser is also disposed near the microlenses to diffuse the diffracted beams 114.

Figure 11A:
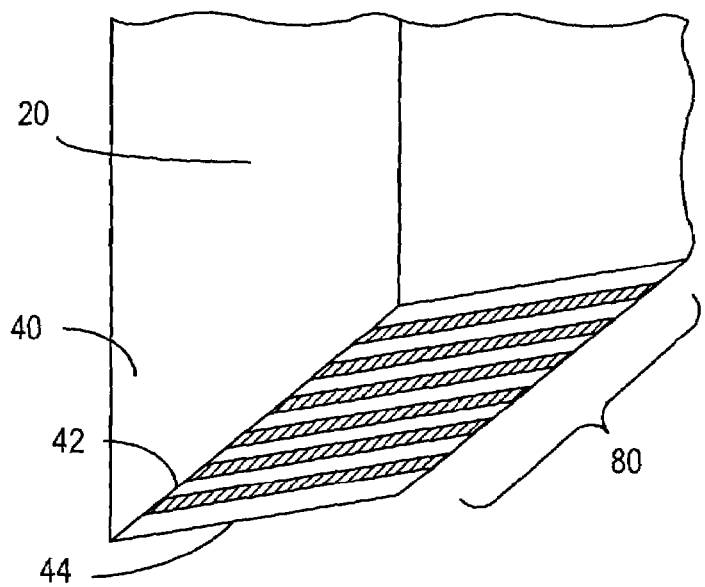
FIG. 11a is a schematic representation showing the orientation of the electrode array.
Figure 11B:
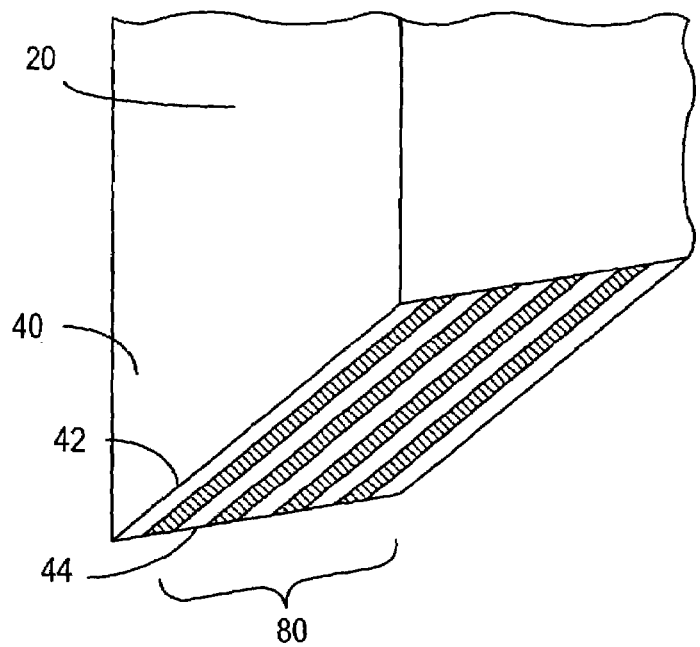
FIG. 11b is a schematic representation showing a different orientation of the electrode array.

It should be noted that the electrode strips of the electrode layer 80, as shown in FIGS. 5a and FIG. 11a, are parallel to the prism edge 44 of a microprism 40. It is also possible that the electrode strips of the electrode layer 80 are arranged to be perpendicular to the prism edge 44, as shown in FIG. 11b.

Figure 12:
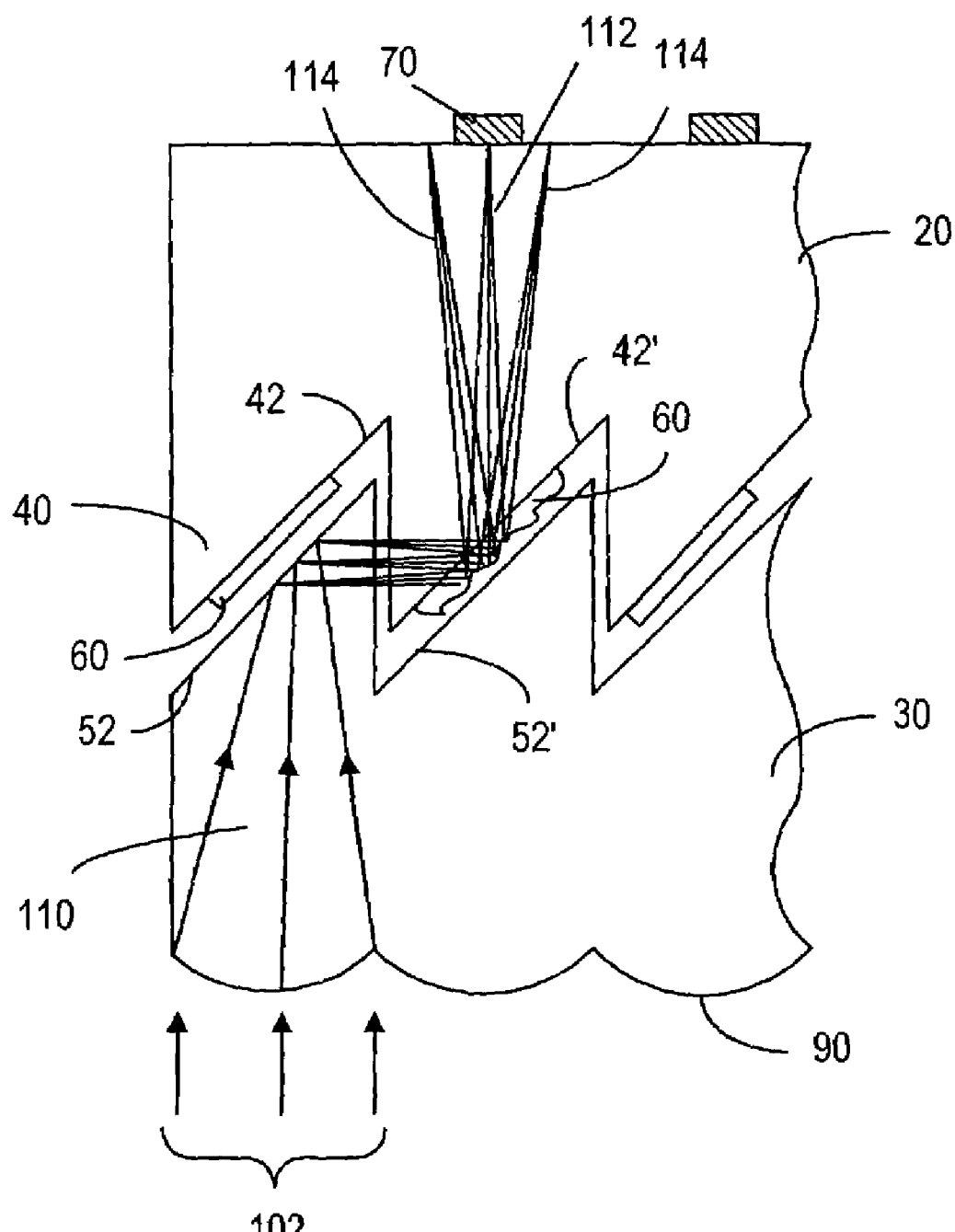
FIG. 12 is a schematic representation showing yet another transmissive design of the direct view display, according to the present invention.

It should also be noted that in the direct view display, as illustrated in FIGS. 3 through 11b, the deformable material 60 is disposed on the interface 52 of the lower microprism 50 of a microprism cell. However, it is also possible to dispose the deformable material 60 on the interface 42 of the upper microprism 40, as shown in FIG. 12.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A display device comprising:
a first substrate having a first side and an opposing second side;
a plurality of beam blockers adjacent the first side of the first substrate, the beam blockers spaced from each others; and
a second substrate having a third side and an opposing fourth side, wherein the third side of the second substrate is spaced from the second side of the first substrate to form a gap therebetween for forming a plurality of pixel cells, each cell comprising:
a first interface on the second side of the first substrate;
a second interface on the third side of the second substrate;
a first electrode layer adjacent the first interface;
a second electrode layer adjacent the second interface, wherein the second electrode layer comprises a plurality of electrode strips spaced from each other at a predetermined period; and
a layer of deformable material disposed between the first and second electrode layers for affecting a light beam traveling from the second substrate toward the second side of the first substrate and then to the first side of the first substrate, wherein the first and second electrode layers are capable of providing an electric field, operable in a first state and in a second state, for influencing the deformable material, such that
when the electric field is in the first state, the deformable material causes the light beam to encounter one of the beam blockers, and
when the electric field is in the second state, the deformable material forms ripples on its surface substantially corresponding to the predetermined period, thereby causing the light beam to diffract at least partially for providing a plurality of spatially shifted beams toward the first side of the first substrate in such a way that at least a portion of the shifted beams is directed away from said beam blocker.

2. The display device of claim 1, further comprising:
a plurality of first prisms on the second side of the first substrate, each first prism having a first prism surface, and
a plurality of second prisms on the third side of the second substrate, each second prism having a second prism surface, such that the first interface includes at least one first prism surface and the second interface includes at least one second prism surface, wherein the deformable material is disposed on said second prism surface, the deformable material having a material surface spaced from said second prism surface, such that the light beam traveling from the second substrate also travels through the deformable material and is directed by the material surface through the second prism surface toward the second side of the first substrate and then reflected by the second interface to the first side of the first substrate; and
when the electric field is in the first state, at least a part of the material surface is substantially flat for directing the light beam via total internal reflection, and
when the electric field is in the second state, at least a part of the material surface is rippled to cause the light beam to diffract.

3. The display device of claim 2, wherein the second electrode layer comprises a plurality of electrode strips spaced from each other by a spacing distance so that when the electric field is in the second state, the rippled surface forms a grating structure with a grating period substantially equal to the spacing distance.

4. The display device of claim 1, further comprising a plurality of microlenses disposed on the fourth side of the second substrate such that in said each cell one of the microlenses focuses the light beam traveling from the second substrate toward the second side of the first substrate and said focusing causes said light beam to focus substantially at said one beam blocker.

5. The display device of claim 4, further comprising a reflecting surface disposed adjacent to the first side of the first substrate to reflect said at least portion of the shifted beam to the fourth side of the second substrate and through said one microlens.

6. The display device of claim 1, further comprising a diffuser layer disposed adjacent to the first side of the first substrate to diffuse said at least portion of the shifted beam.

7. The display device of claim 1, further comprising a reflecting surface disposed adjacent to the first side of the first substrate to reflect said at least portion of the shifted beam to the fourth side of the second substrate.

8. The display device of claim 1, wherein said one beam blocker comprises a reflecting surface to cause the light beam encountering said one beam blocker to travel from the first side of the first substrate to the second side of the substrate, the third side of the second substrate and then the fourth side of the substrate, said display device further comprising a light absorber layer disposed adjacent the first side of the first substrate to absorb said at least portion of the shifted beam.

9. The display device of claim 1, further comprising:
a plurality of first prisms on the second side of the first substrate, each first prism having a first prism surface, and
a plurality of second prisms on the third side of the second substrate, each second prism having a second prism surface, such that the first interface includes at least one first prism surface and the second interface includes at least one second prism surface, wherein the deformable material is disposed on said first prism surface, the deformable material having a material surface spaced from said first prism surface, such that the light beam traveling from the second substrate is also reflected by the second prism surface through the first prism surface, through the deformable material and is directed by the material surface through the first prism surface toward the first side of the first substrate, and
when the electric field is in the first state, at least a part of the material surface is substantially flat for directing the light beam via total internal reflection, and
when the electric field is in the second state, at least a part of the material surface is rippled to cause the light beam to diffract.

10. The display device of claim 9, further comprising a plurality of microlenses disposed on the fourth side of the second substrate such that one of the microlenses focuses the light beam traveling from the second substrate toward the second side of the first substrate in said each cell and said focusing causes said light beam to focus substantially at said one beam blocker.

11. A method of operating a pixel of a display device in a first pixel state and a second pixel state, the display device comprising a first substrate and a second substrate, the first substrate having a first side and an opposing second side, the second substrate having a third side and an opposing fourth side adjacent the second side of the first substrate, wherein the pixel comprises:
a beam blocker adjacent the first side of the first substrate, and
a cell having a first interface on the first side of the first substrate and a second interface on the third side of the second substrate, the first and second interfaces spaced from each other forming a gap therebetween so as to allow a light beam to travel from the second substrate through the second interface toward the first interface and the first side of the first substrate, and then to the beam blocker, said method comprising the steps of:
providing in the gap a layer of deformable material capable of influencing the light beam,
disposing a first electrode layer on the first interface and a second electrode layer on the second interface, wherein the second electrode layer comprises a plurality of electrode strips spaced from each other at a predetermined period, and
providing an electric field between the first electrode layer and the second electrode layer, for causing the deformable material to operate in a first surface form when the pixel is operated in the first pixel state, and a second surface form when the pixel is operated in the second pixel state, wherein
when the deformable material is operated in the first surface form, the deformable material causes the light beam to encounter the beam blocker, and
when the deformable material is operated in the second surface form, the deformable material forms ripples on its surface substantially corresponding to the predetermined period, thereby causing the light beam to diffract at least partially for providing a plurality of spatially shifted beams such that at least a portion of the shifted beams is directed away from the beam blocker.

12. The method of claim 11, wherein the display device further comprises:
a plurality of first prisms on the second side of the first substrate, each prism having a first prism surface; and
a plurality of second prisms on the third side of the second substrate, each second prism having a second prism surface, such that the first interface includes at least one first prism surface and the second interface includes at least one second prism surface, wherein the deformable material is disposed on said second prism surface, the deformable material having a material surface spaced from said second prism surface, such that the light beam traveling from the second substrate also travels through the deformable material and is directed by the material surface through the second prism surface toward the second side of the first substrate and then reflected by the second interface to the first side of the first substrate; and
when the deformable material is operated in the first surface form, at least a part of the material surface is substantially flat for directing the light beam via total internal reflection toward the beam blocker, and
when the deformable material is operated in the second surface form, at least a part of the material surface is rippled to cause the light beam to diffract.

13. The method of claim 11, further comprising the step of providing a reflecting surface adjacent the first side of the first substrate to reflect said at least portion of the shifted beam to the forth side of the second substrate.

14. The method of claim 11, further comprising the steps of:
providing a reflecting surface on said one beam blocker to cause the light beam encountering the beam blocker to travel from the first side of the first substrate to the second side of the substrate, the third side of the second substrate and then the fourth side of the second substrate, and
providing a light absorber layer adjacent the first side of the first substrate to absorb said at least portion of the shifted beam.

15. The method of claim 11, wherein the display device further comprises:
a plurality of first prisms on the second side of the first substrate, each prism having a first prism surface; and
a plurality of second prisms on the third side of the second substrate, each second prism having a second prism surface, such that the first interface includes at least one first prism surface and the second interface includes at least one second prism surface, wherein the deformable material is disposed on said first prism surface, the deformable material having a material surface spaced from said first prism surface, such that the light beam traveling from the second substrate is reflected by the second prism surface through the first prism surface, through the deformable material and is directed by the material surface through the first prism surface toward the first side of the first substrate, and
when the deformable material is operated in the first surface form, at least a part of the material surface is substantially flat for directing the light beam via total internal reflection toward the beam blocker, and
when the deformable material is operated in the second surface form, at least a part of the material surface is rippled to cause the light beam to diffract.

* * * * *